US011140260B2

(12) United States Patent
Agarwal (10) Patent No.: US 11,140,260 B2
(45) Date of Patent: *Oct. 5, 2021

(54) ENHANCED USER PROFILE INFORMATION DISPLAY ON TERMINATING HANDSET

(71) Applicant: T-Mobile USA, Inc., Bellevue, WA (US)

(72) Inventor: Bikash Agarwal, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,667

(22) Filed: May 20, 2020

(65) Prior Publication Data

US 2020/0280630 A1 Sep. 3, 2020

Related U.S. Application Data

(63) Continuation of application No. 16/132,263, filed on Sep. 14, 2018, now Pat. No. 10,778,836.

(Continued)

(51) Int. Cl.
*H04M 3/42* (2006.01)
*H04L 29/06* (2006.01)
*H04M 1/57* (2006.01)

(52) U.S. Cl.
CPC .... *H04M 3/42068* (2013.01); *H04L 65/1006* (2013.01); *H04L 65/1016* (2013.01); *H04M 1/575* (2013.01); *H04M 3/42042* (2013.01)

(58) Field of Classification Search
CPC ............. H04M 3/42068; H04M 1/575; H04M 3/42042; H04M 3/42085; H04M 3/42093;

(Continued)

(56) References Cited

U.S. PATENT DOCUMENTS 9,503,573 B1 * 11/2016 Belford ............ H04M 3/42042
2002/0067816 A1 * 6/2002 Bushnell .................. H04Q 3/72
379/201.02

(Continued)

FOREIGN PATENT DOCUMENTS

CN         1798203 A    7/2006
JP      2002218063 A    8/2002
KR    20040093231 A   11/2004

OTHER PUBLICATIONS

International Searching Authority, International Search Report and Written Opinion, PCT Patent Application PCT/US2019/037391, dated Oct. 4, 2019, 12 pages.

*Primary Examiner* — Huy C Ho
(74) *Attorney, Agent, or Firm* — Perkins Coie LLP (57) ABSTRACT

The disclosed system enables the display of enhanced user profile information on a terminating handset of a call recipient. A caller initially submits enhanced user profile information to a telecommunications service provider, such as the caller's name, company name, physical address, e-mail address, and photograph. When the caller places a phone call, the enhanced user profile information is displayed on a terminating handset of the call recipient. The enhanced user profile information may be transmitted directly to the call recipient or may be retrieved by a network associated with the called party. The disclosed system provides management options for both the caller and the call recipient. For example, the call recipient may specify a preference to automatically save the enhanced user profile information on the terminating handset, or the caller may specify a preference to disable or enable the display of enhanced user profile information on the terminating handset.

20 Claims, 5 Drawing Sheets

Related U.S. Application Data (60) Provisional application No. 62/497,316, filed on Jun. 21, 2018.

(58) Field of Classification Search
CPC ........... H04M 3/42102; H04M 3/4211; H04M 1/576; H04M 3/42025; H04M 3/42034; H04M 3/42059; H04L 65/1016; H04L 65/1006; H04L 65/1069; H04L 65/1063
USPC ........................................................ 455/415
See application file for complete search history.

(56) References Cited

U.S. PATENT DOCUMENTS

| | | | |
|---|---|---|---|
| 2005/0073999 A1* | 4/2005 | Koch | ................ H04M 3/42042 370/352 |
| 2007/0195942 A1 | 8/2007 | Woodring | |
| 2013/0035054 A1 | 2/2013 | Ashton | |
| 2016/0366242 A1 | 12/2016 | Oh et al. | |
| 2019/0394328 A1 | 12/2019 | Agarwal | |

* cited by examiner

ENHANCED USER PROFILE INFORMATION DISPLAY ON TERMINATING HANDSET

CROSS-REFERENCE TO RELATED APPLICATION

This application is a continuation of U.S. application Ser. No. 16/132,263, filed Sep. 14, 2018, entitled "ENHANCED USER PROFILE INFORMATION DISPLAY ON TERMINATING HANDSET", which claims the benefit of the inventor's U.S. Provisional Patent Application No. 62/497,316, filed Jun. 21, 2018, entitled "ENHANCED USER PROFILE INFORMATION DISPLAY ON TERMINATING HANDSET", both of which are incorporated by reference in their entirety.

BACKGROUND

As the volume of calls placed to mobile devices increases, users of mobile devices need more sophisticated options for deciding which calls to accept and which calls to reject. For incoming calls received in typical telecommunications systems, a mobile device user is limited to viewing information provided by Calling Name Delivery (CNAM) or CallerID services that display only a telephone number and/or a name of the caller. Often, such limited information is not sufficient to allow a call recipient to make an informed decision on whether or not to take an incoming call. For example, a call recipient may wish to specifically accept calls from callers associated with a certain company (e.g., a company at which the caller has applied for a job) or, conversely, a call recipient may wish to specifically reject calls from callers from a certain company (e.g., a known telemarketing company). In some instances, a call recipient may receive a call from a new contact when the call recipient has forgotten the new contact's name but still remembers the new contact's face or physical address. In such instances, traditional systems fail because the caller's name and telephone number is of virtually no use to the call recipient. Moreover, with the widespread availability of call spoofing software, traditional CNAM or CallerID systems are vulnerable to malicious callers who may easily provide a fictitious name and telephone number to mislead the call recipient. Without additional information to gauge the veracity of such information, the call recipient is more likely to accept fraudulent or otherwise unwanted calls. These and other problems exist with traditional systems. Therefore, a solution is needed that allows call recipients to view enhanced user profile information associated with incoming telephone calls so that a call recipient can make a more intelligent decision as to whether to accept or reject a call.

DETAILED DESCRIPTION

The disclosed system provides a facility to allow enhanced user profile information of a caller to be displayed to a call recipient. The system is adapted to operate in various types of telecommunications networks, including second-generation wireless telephone technology (2G) networks, third-generation wireless telephone technology (3G) networks, fourth-generation wireless telephone technology (4G) networks, long-term evolution (LTE) networks and fifth-generation wireless telephone technology (5G). The system makes use of various industry standards, including 3rd Generation Partnership Project (3GPP) and Groupe Spéciale Mobile Association (GSMA) standards.

In the disclosed system, a user (e.g., a telecommunications service subscriber who may initiate a call to a call recipient) initially submits enhanced user profile information to a telecommunications service provider. The enhanced user profile information may include not only the user's name, but also a company name, a physical address (e.g. business or home), e-mail address, photograph, and/or additional information that may be associated with the user. In some embodiments, a telecommunications provider may store the enhanced user profile information on a server within the telecommunications network, such as an Enterprise Information Technology (EIT) server. In addition, the user may set one or more user preferences with the telecommunications provider regarding use of the enhanced user profile information. For example, the user may specify that the enhanced user profile information should be made available by default to a call recipient, or the user may specify that the enhanced user profile information should be made available only when the user enters a predefined code when placing a phone call (such as a three-digit short code appended to a called telephone number). Similarly, a user may specify options regarding the receipt of enhanced user profile data from other users when receiving an incoming call. For example, the user may specify a desire to display enhanced profile data by default, or to not display enhanced profile data by default. In some embodiments, the system stores user preferences within the telecommunications network, for example on a TAS server.

In one embodiment, when a user initiates a telephone call to a call recipient, the user's enhanced user profile information is transmitted to the call recipient along with the call request. In another embodiment, when a user initiates a telephone call to a call recipient, the network serving the call recipient requests the caller's enhanced user profile information from a server storing that information and then presents the received enhanced user profile information of the caller to the call recipient. As a result, when a notification of an incoming call is received (such as ringing on the call recipient's mobile phone), the caller's enhanced user profile information is also displayed on the mobile device concurrently with the call notification.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
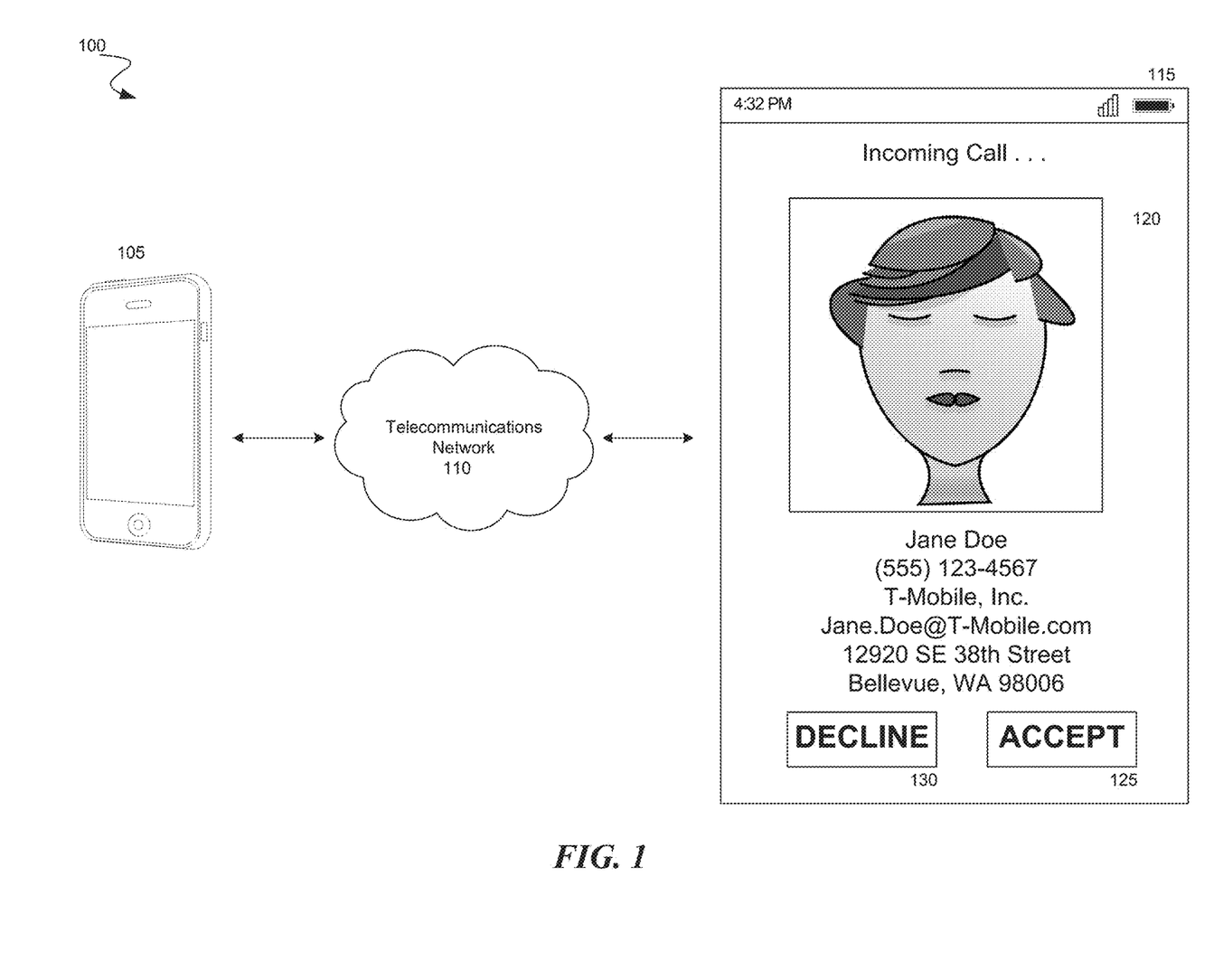
FIG. 1 is a diagram of a representative environment in which a system to provide the display of enhanced user profile information on a terminating handset may operate.

FIG. 1 is a diagram of a representative environment 100 in which a system to provide the display of enhanced user profile information on a terminating handset may operate. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

In the environment 100, mobile device 105 may initiate a telephone call to a call recipient via telecommunications network 110. Upon receiving the request, a mobile device of the call recipient may present a notification screen 115 that displays the caller's enhanced user profile information 120 along with an option to accept the incoming telephone call (125) or reject the incoming telephone call (130). Telecommunications network 110 may be any telecommunications network capable of facilitating the transfer of telephone calls between mobile devices of a caller and a call recipient, including for example an IMS network. IMS is an architectural framework for delivering Internet Protocol ("IP") multimedia to mobile users, such as users of mobile devices like smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP"™). To allow the IMS core to be integrated with Internet resources, the 3G PP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams.

Figure 2:
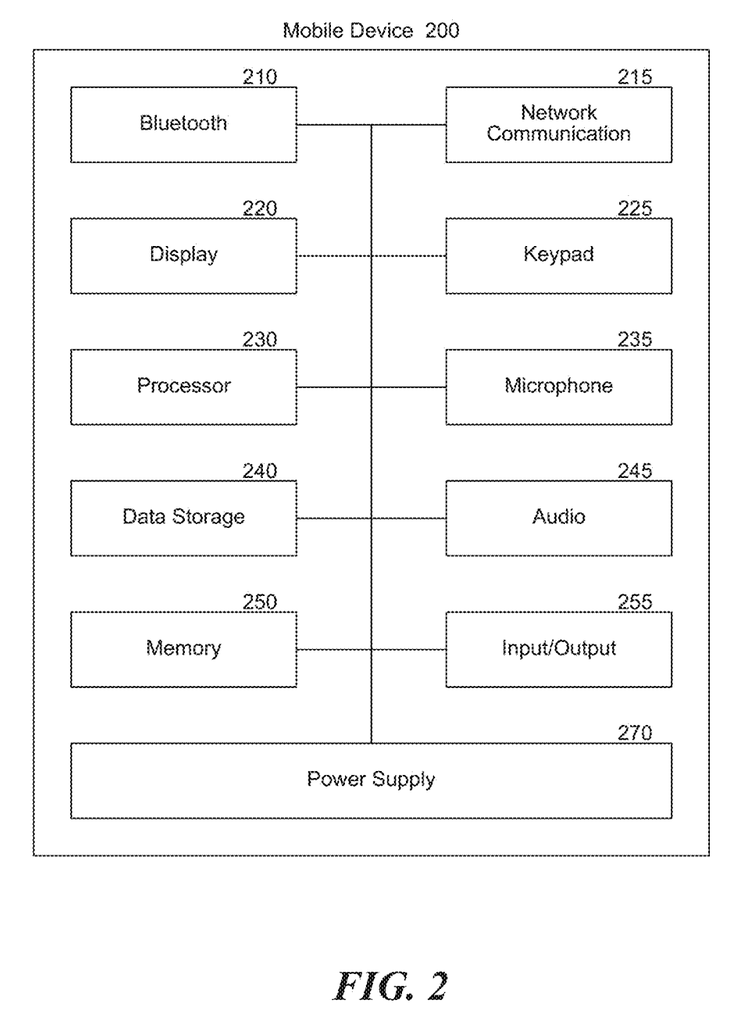
FIG. 2 is a block diagram of a representative mobile device that may serve as a terminating handset on which enhanced user profile information may be displayed in accordance with embodiments herein.

FIG. 2 is a block diagram of a representative mobile device 200 that may serve as a terminating handset on which a caller's enhanced user profile information may be displayed in accordance with embodiments herein. Mobile device 200 typically includes a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth Interface 210; and Network Communication Interface 215, which enables the mobile phone to communicate by transmitting and receiving wireless signals using licensed, semi-licensed or unlicensed spectrum over a telecommunications network), an audio interface 245, a display 220, a keypad or keyboard 225, a microphone 235, and other input and/or output interfaces 255. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP or Diameter protocol clients capable of generating, transmitting and interpreting syntactically correct SIP or Diameter protocol messages. SIP clients permit the mobile device to register with and communicate via the IMS network.

Mobile device 200 may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile device 200 may connect to a telecommunications network via a trusted radio access network (RAN) or an untrusted RAN. A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Figure 3:
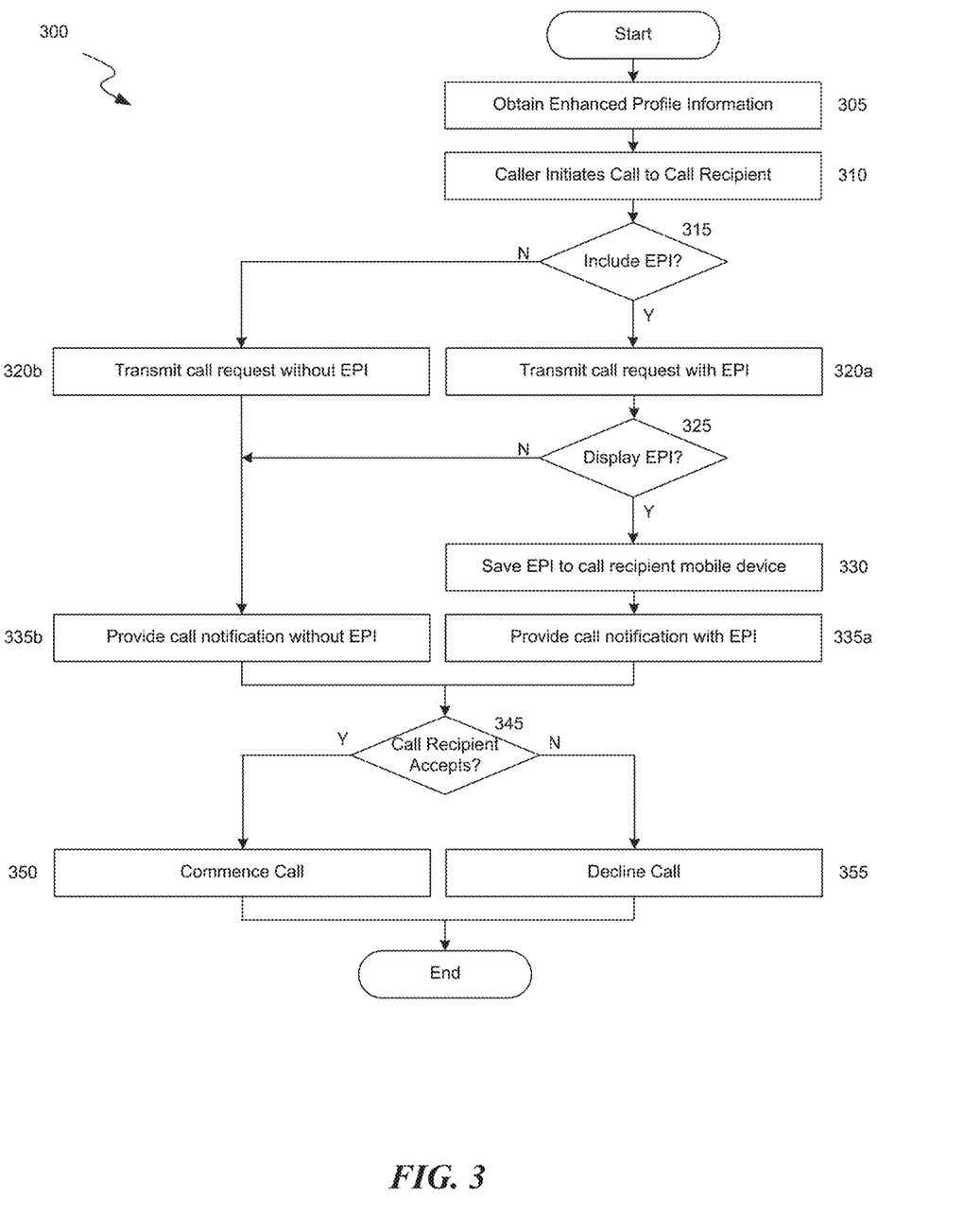
FIG. 3 is a flowchart showing a procedure for displaying enhanced user profile information on a terminating handset in accordance with embodiments disclosed herein.

FIG. 3 is a flowchart 300 showing a procedure for displaying enhanced user profile information on a terminating handset in accordance with embodiments disclosed herein. In the embodiment of FIG. 3, a caller's enhanced user profile information is transmitted to a call recipient along with a call request, as explained in more detail below. At block 305, enhanced user profile information is obtained from a user. Enhanced user profile information may include without limitation the user's full name, preferred name, employer name, physical address (e.g. business mailing address), e-mail address, and/or photograph. In some embodiments, enhanced user profile information is obtained from a user at the time that the user initially contracts for service with a telecommunications provider, or at any time that the user initiates an update of enhanced user profile information with the telecommunications provider. In some embodiments, the telecommunications provider stores the enhanced user profile information within the telecommunications network, such as in an EIT server. For security purposes, and to mitigate or prevent potential fraud within the network, the telecommunications provider may verify some or all information submitted by a user before such information is included in the user's enhanced profile. In addition to storing enhanced user profile information, the telecommunications provider may also store user preferences including, for example, an indication of whether the user would like her enhanced user profile information to be transmitted with a call request by default or an indication of whether the user would like to display enhanced user profile information of a calling party by default when receiving an incoming call.

At block 310, a caller initiates a request to establish a telephone call with a call recipient. At block 315, the system determines whether the caller's enhanced user profile information should be made available to the call recipient along with the call request. To make this determination, the system may look up the caller's stored preferences to determine whether the caller has indicated a default preference to include her enhanced user profile information when making a call request or to exclude her enhanced user profile information when making a call request. In some embodiments, the user may indicate a preference to exclude enhanced user profile information by default unless the user initiates a telephone call with a short code (e.g., appending *468 to a dialed phone number). Similarly, in some embodiments a user may indicate a preference to include enhanced user profile information by default unless the user initiates a telephone call with a short code (e.g., appending *467 to a dialed phone number). Accordingly, the system may determine that the caller's enhanced user profile information should be transmitted with the call request if either (a) the user has a default preference to include user profile information and did not enter a short code to specifically block her user profile information from being sent, or (b) the caller has a default preference to exclude her enhanced user profile information but entered a short code to specifically include her user profile information despite her default preference. Alternatively or additionally, the system may employ a PIN code-based authorization after a call has started and provide a link via Multimedia Messaging Service (MMS) or Short Messaging Service (SMS) so that the call recipient can save the caller's enhanced profile information either after the call has ended or while the call is in progress.

At block 315, if the system determines that the caller's enhanced user profile information should not be displayed to the call recipient (e.g., because the caller dialed a short code such as *67 before the terminating phone number), then the system proceeds to block 320b to transmit the call request without including the caller's enhanced user profile information, and then proceeds to block 335b to provide a notification of the incoming call (e.g., a ring or other notification) without displaying the caller's enhanced user profile information on the handset of the call recipient. At block 345, the system proceeds to block 350 to commence the telephone call if the call recipient accepts the incoming call request, or proceeds to block 355 to decline the call if the call recipient rejects the incoming call request.

At block 315, if the system determines that the caller's enhanced user profile information should be displayed to the call recipient, then the system proceeds to block 320a to transmit the call request along with the caller's enhanced user profile information. In the embodiment of FIG. 3, the system may retrieve the caller's stored enhanced user profile information and transmit the retrieved information along with the call request. For example, in one embodiment, the system may transmit a call request in the form of a Session Initiation Protocol (SIP) INVITE message, and may embed the caller's enhanced user profile information in one or more headers (e.g., the P-Asserted-Identity: header) of the SIP INVITE message.

At block 325, the system determines whether the call recipient wishes to view the caller's enhanced user profile information along with the incoming call request. To make this determination, the system may look up the call recipient's stored preferences (e.g., preferences stored on a telecommunications provider's network, such as on an EIT server) to determine whether the call recipient has indicated a default preference to receive a caller's enhanced user profile information with a call request or to exclude a caller's enhanced user profile information with a call request. In some embodiments, a user may indicate a preference to hide enhanced user profile information by default or display enhanced user profile information by default. In some embodiments, the caller's enhanced profile information is displayed to a called party if the called party has "calling name presentation" enabled in a home location register (HLR) of a telecommunications network. Conversely, in some embodiments, the caller's enhanced profile information is not displayed to a called party if the called party does not have "calling name presentation" enabled in the HLR. At block 325, if the system determines that the call recipient does not wish to view the caller's enhanced user profile information, then the system proceeds to block 335b to provide a notification of the incoming call without displaying the caller's enhanced user profile information on the handset of the call recipient. At block 345, the system proceeds to block 350 to commence the telephone call if the call recipient accepts the incoming call request, or proceeds to block 355 to decline the call if the call recipient rejects the incoming call request. At block 325, if the system determines that the call recipient wishes to view the caller's enhanced user profile information, then the system proceeds to block 330 to save the caller's enhanced user profile information. In some embodiments, the caller's enhanced user profile information may be saved on a mobile device of the call recipient (or in a remote location accessible by the mobile device of the call recipient) such that the call recipient may easily recall such enhanced user profile information for future use. The enhanced profile information may be saved automatically via functionality built into the mobile device as shipped from the mobile device manufacturer, or the enhanced profile information may be saved automatically via a separate application that is downloaded and installed on the mobile device by a user. In addition, when automatically saving incoming enhanced profile information, the disclosed system may also save location information of the caller. In some embodiments, the location information comprises a latitude and longitude of the caller. At block 335a, the system provides a notification of the incoming call and concurrently displays the caller's enhanced user profile information on the handset of the call recipient. At block 345, the system proceeds to block 350 to commence the telephone call if the call recipient accepts the incoming call request, or proceeds to block 355 to decline the call if the call recipient rejects the incoming call request.

Figure 4:
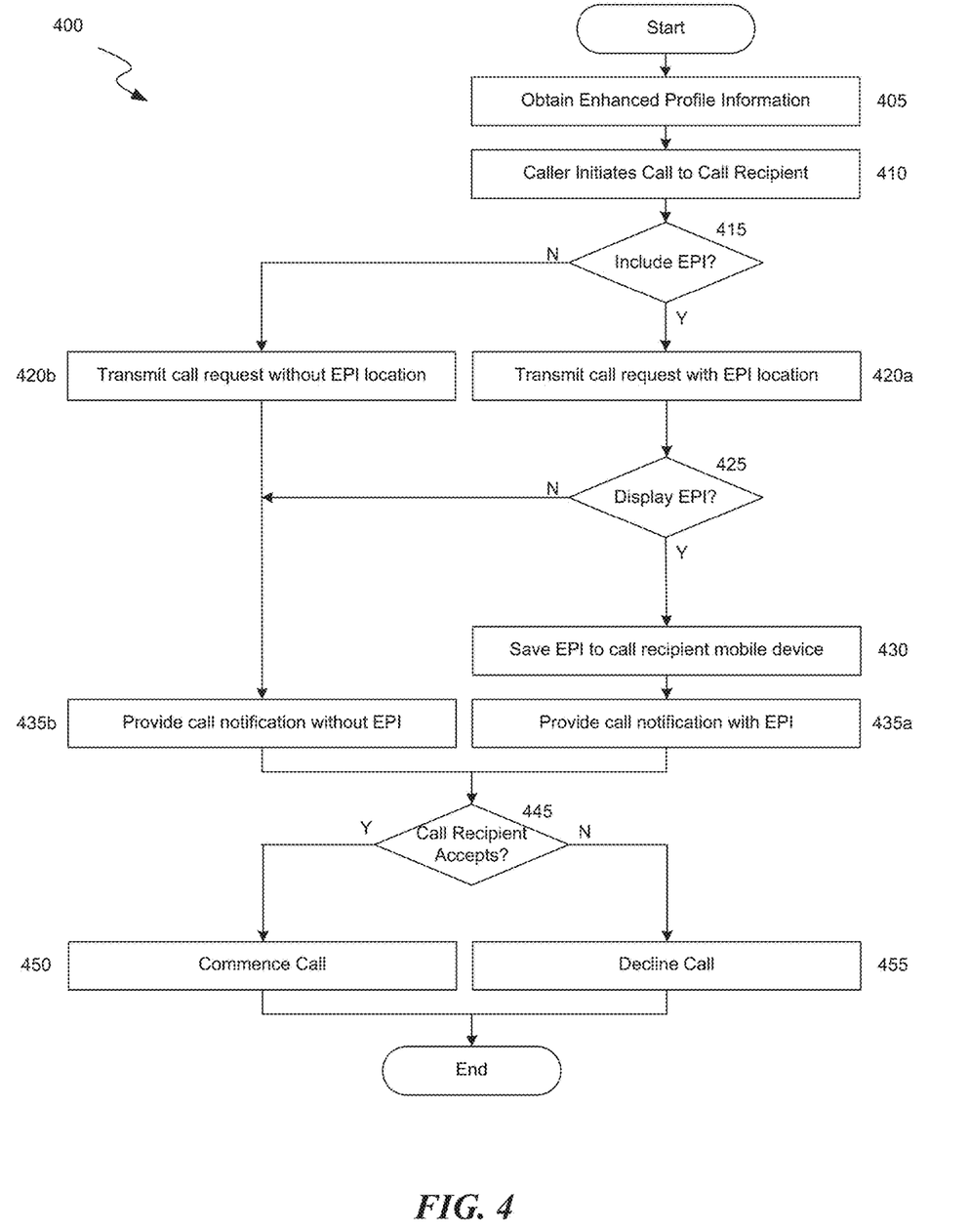
FIG. 4 is a flowchart showing a procedure for displaying enhanced user profile information on a terminating handset in accordance with embodiments disclosed herein.

FIG. 4 is a flowchart 400 showing a procedure for displaying enhanced user profile information on a terminating handset in accordance with embodiments disclosed herein. The embodiment of FIG. 4 differs from the embodiment of FIG. 3 in that a caller's enhanced user profile information is not initially transmitted to a call recipient along with a call request. Instead, in the embodiment of FIG. 4, an indication that the caller's enhanced user profile information is available is transmitted along with the call request. As described in more detail below, if the system determines that the caller's enhanced user profile information should be displayed to the call recipient, then the system retrieves the enhanced user profile information for subsequent display on the terminating handset of the call recipient. At block 405, enhanced user profile information is obtained from a user. At block 410, a caller initiates a request to establish a telephone call with a call recipient. At block 415, the system determines whether the caller's enhanced user profile information should be made available to the call recipient along with the call request as previously described with respect to FIG. 3. If the system determines that the caller's enhanced user profile information should not be displayed to the call recipient, then the system proceeds to block 420b to transmit the call request without including a link to the caller's enhanced user profile information, and then proceeds to block 435b to provide an indication of an incoming call (e.g., a ring or other notification) without retrieving the caller's enhanced user profile information via a link in the call request and without displaying the caller's enhanced user profile information on a handset of the call recipient. At block 445, the system proceeds to block 450 to commence the telephone call if the call recipient accepts the incoming call request, or proceeds to block 455 to decline the call if the call recipient rejects the incoming call request.

At block 415, if the system determines that the caller's enhanced user profile information should be displayed to the call recipient, then the system proceeds to block 420a to transmit the call request along with a link to the caller's enhanced user profile information. The link to the caller's enhanced user profile information may comprise a hyperlink to a web server containing the enhanced user profile information, an identification of a logical address at which the enhanced user profile information is available, or a different type of identifier sufficient for the system to locate the enhanced user profile information from a server or other storage. In the embodiment of FIG. 4, the system may transmit a call request in the form of a SIP INVITE message, and may embed a link to the caller's enhanced user profile information in one or more headers (e.g., the P-Asserted-Identity: header) of the SIP INVITE message.

At block 425, the system determines whether the call recipient wishes to view the caller's enhanced user profile information along with the incoming call request based on stored preferences associated with the call recipient. At block 425, if the system determines that the call recipient does not wish to view the caller's enhanced user profile information, then the system proceeds to block 435b to provide a notification of the incoming call without displaying the caller's enhanced user profile information on the handset of the call recipient. At block 445, the system proceeds to block 450 to commence the telephone call if the call recipient accepts the incoming call request, or proceeds to block 455 to decline the call if the call recipient rejects the incoming call request. At block 425, if the system determines that the call recipient wishes to view the caller's enhanced user profile information, then the system proceeds to block 430 to save the caller's enhanced user profile information. At block 435a, the system provides an indication of the incoming call while also displaying the caller's enhanced user profile information on a handset of the call recipient. At block 445, the system proceeds to block 450 to commence the telephone call if the call recipient accepts the incoming call request, or proceeds to block 455 to decline the call if the call recipient rejects the incoming call request.

Figure 5:
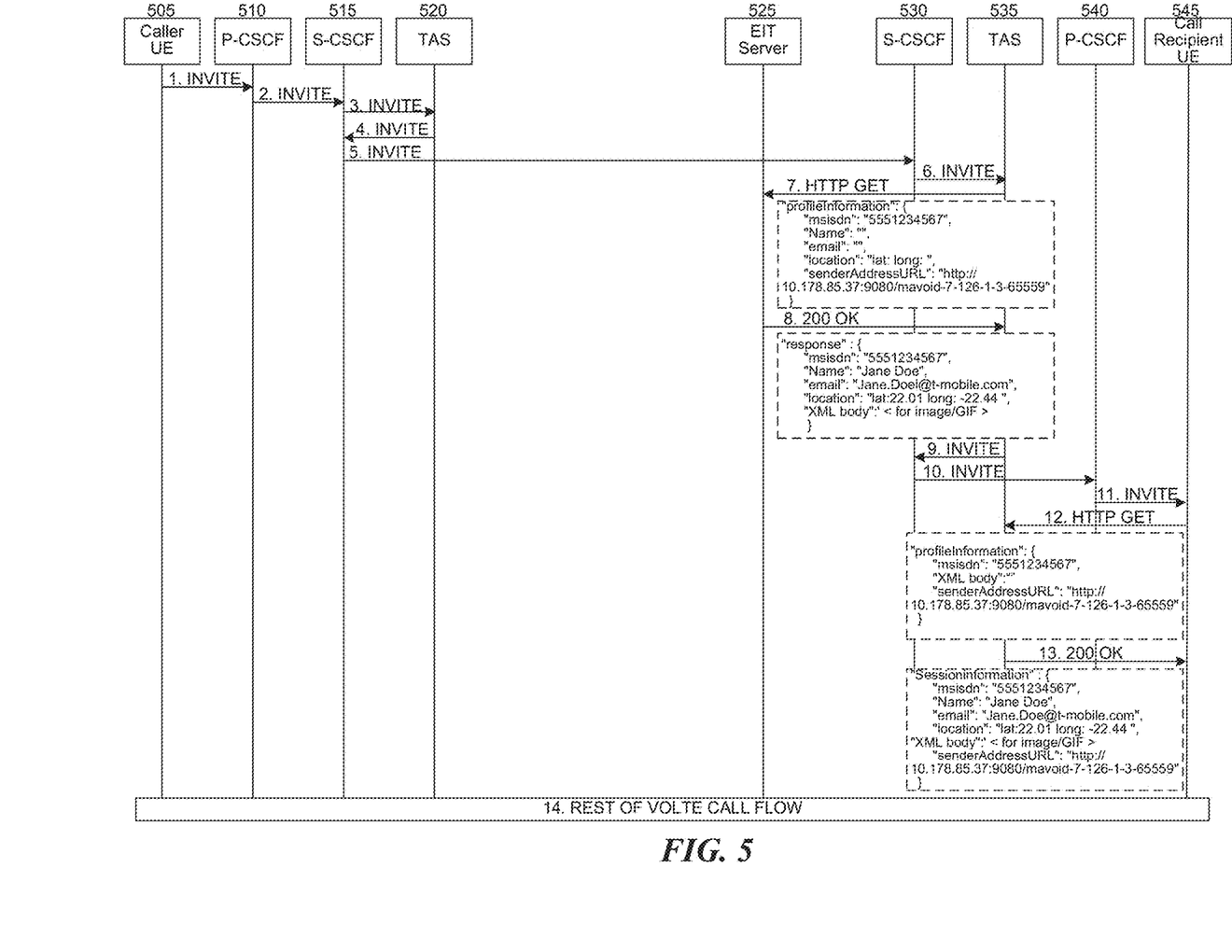
FIG. 5 is a call flow diagram for displaying enhanced user profile information on a terminating handset in accordance with embodiments disclosed herein.

FIG. 5 is a call flow diagram 500 for displaying enhanced user profile information on a terminating handset in accordance with embodiments disclosed herein. At step 1, Caller User Equipment (UE) 505 initiates a call request to Call Recipient UE 545 by transmitting an SIP INVITE towards Proxy Call Session Control Function (CSCF) 510. Caller UE 505 and Call Recipient UE 545 may each be a mobile device belonging to a caller and a call recipient, respectively. At step 2, P-CSCF 510 transmits the INVITE towards Serving Call Session Control Function (S-CSCF) 515, which transmits the INVITE towards TAS 520 at step 3. At step 4, TAS 520 transmits the INVITE back towards S-CSCF 515. At step 5, S-CSCF 515 transmits the INVITE message towards S-CSCF 530, which then transmits the INVITE message towards TAS 535 at step 6. The system may look up the call recipient's preferences in TAS 535 to determine whether the call recipient wishes to have the caller's enhanced user profile information displayed on Call Recipient UE 545. If the system determines that the call recipient does wish to receive the caller's enhanced user profile information, then at step 7 TAS 535 transmits an HTTP GET message towards EIT server 525. An exemplary HTTP GET message that may be transmitted at step 7 is provided below.

```
"profileInformation": {
    "msisdn": "5551234567",
    "Name": "",
    "email": "",
    "location": "lat: long: ",
    "senderAddressURL": "http://
    10.178.85.37:9080/mavoid-7-126-1-3-
    65559"
}
```

At step 8, EIT server 525 responds to the HTTP GET message by transmitting a 200 OK message towards TAS 535. The 200 OK message contains enhanced user profile information and/or a ling to enhanced profile information of the caller. An exemplary 200 OK message is provided below.

```
"response" : {
    "msisdn": "5551234567",
    "Name": "Jane Doe",
    "email": "Jane.Doe@t-mobile.com",
    "location": "lat:22.01 long: −22.44 ",
    "XML body":' < for image/GIF >
}
```

Because TAS 535 is an application server and does not know the P-CSCF address for terminating Call Recipient UE 545, TAS 535 transmits the INVITE message towards S-CSCF 530 (step 9), which then transmits the INVITE massage towards P-CSCF 540 (step 10). P-CSCF 540 then transmits the INVITE message towards Call Recipient UE 545 (step 11). At step 12, Call Recipient UE 545 transmits an HTTP GET message towards TAS 535. An exemplary HTTP GET message that may be transmitted at step 12 is provided below:

```
"profileInformation": {
    "msisdn": "5551234567",
    "XML body":"",
    "senderAddressURL": "http://
    10.178.85.37:9080/mavoid-7-126-1-3-
    65559"
}
```

At step 13, TAS 535 transmits the caller's enhanced user profile information to Call Recipient UE 545 via a 200 OK message. An exemplary 200 OK message that may be transmitted in step 13 is provided below.

```
"Sessioninformation" : {
    "msisdn": "5551234567",
    "Name": "Jane Doe",
    "email": "Jane.Doe@t-mobile.com",
    "location": "lat:22.01 long: −22.44 ",
    "XML body":' < for image/GIF >"
    "senderAddressURL": "http://
    10.178.00.37:9080/mavoid-7-126-1-3-
7 65559"
}
```

At step 14, the system completes the remaining steps of a VoLTE call flow in accordance with applicable 3GPP standards. Although the embodiment of FIG. 5 illustrates that Call Recipient UE 545 may obtain enhanced user profile information by transmitting an HTTP GET message towards TAS 535 (step 12) and receiving the requested enhanced user profile information from TAS 535 via a 200 OK message (step 13), other embodiments are possible. For example, in some embodiments, EIT server 525 may send the enhanced user profile information directly to Call Recipient UE 545 via an HTTP POST message.

Remarks

The Figures and above description provide a brief, general description of a suitable environment in which the invention can be implemented. Although not required, aspects of the invention may be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. At least one computer-readable medium, excluding transitory signals, and storing instructions, which when executed by a data processor, implement a method for transmitting user profile information of a calling party for display on a terminating device of a call recipient, the instructions comprising:
   receiving, from the calling party, a request to initiate a communication with a call recipient;
   determining that the calling party wishes to make user profile information of the calling party available to the call recipient based in part on evaluating whether the request to initiate the communication includes a predefined short code appended to a called number of the call recipient; and
   transmitting the request to initiate the communication between the calling party and the call recipient,
      wherein the transmitting includes providing information to enable a terminating device of the call recipient to display at least a portion of user profile information of the calling party.

2. The at least one computer-readable medium of claim 1, wherein prior to displaying the user profile information of the calling party, the terminating device of the call recipient determines that the call recipient wishes to view the user profile information of the calling party.

3. The at least one computer-readable medium of claim 1, wherein the provided information comprises the user profile information of the calling party within the transmitted request, and wherein the user profile information includes information other than a calling party's name or calling party's phone number, or includes information in addition to the calling party's name or calling party's phone number.

4. The at least one computer-readable medium of claim 1, wherein the user profile information is stored in the telecommunications network, and wherein the provided information comprises a logical address location within the telecommunications network at which the user profile information of the calling party is obtainable.

5. The at least one computer-readable medium of claim 1, wherein the user profile information is stored in the terminating device of the call recipient.

6. The at least one computer-readable medium of claim 1, wherein the telecommunications network is an Internet Protocol Multimedia Subsystem (IMS) network, and wherein the user profile information is stored on an Enterprise Information Technology (EIT) server.

7. The at least one computer-readable medium of claim 1, wherein the user profile information of the calling party comprises one or more of: a company name, a physical address, an e-mail address, or a photograph of the calling party.

8. A system configured for transmitting user profile information of a calling party for display on a terminating device of a call recipient, the system comprising:
   at least one processor;
   at least one memory communicatively coupled to the at least one processor and storing instructions, which when executed by the at least one processor, performs operations for:
      receiving, from the calling party, a request to initiate a communication with the call recipient;
      determining that the calling party wishes to make user profile information of the calling party available to the call recipient based in part on evaluating whether the request to initiate the communication includes a predefined short code appended to a called number of the call recipient; and
      transmitting the request to initiate the communication between the calling party and the call recipient,
         wherein the transmitting includes providing information to enable a terminating device of the call recipient to display at least a portion of the user profile information of the calling party.

9. The system of claim 8, wherein providing the information further enables the terminating device of the call recipient to automatically save the user profile information, location information, or both.

10. The system of claim 8, wherein the provided information comprises the user profile information of the calling party or a location at which the profile information of the calling party may be obtained.

11. The system of claim 8, wherein the request to initiate the telephone call is a Session Initiation Protocol (SIP) INVITE message, and wherein the information sufficient to enable the terminating device of the call recipient to display the user profile information of the calling party is embedded in one or more headers of the SIP INVITE message.

12. The system of claim 8, wherein the user profile information is stored at the terminating device of the call recipient.

13. The system of claim 8, wherein the telecommunications network is an Internet Protocol Multimedia Subsystem (IMS) network.

14. The system of claim 8, wherein the user profile information of the calling party comprises one or more of: a name, a company name, a physical address, an e-mail address, or a photograph of the calling party.

15. A non-transitory computer-readable medium comprising instructions configured to cause one or more processors to perform a method for receiving user profile information of a calling party for display on a terminating handset of a call recipient, the method comprising:

determining that the calling party wishes to make ire user profile information of the calling party available to the call recipient based in part on evaluating whether the request to initiate the communication includes a predefined short code appended to a called number of the call recipient; and     receiving a request to initiate a communication between the calling party and the call recipient,         wherein the receiving includes information sufficient to enable a terminating handset of the call recipient to display the user profile information of the calling party.

16. The non-transitory computer-readable medium of claim 15, wherein the information sufficient to enable further enables the terminating handset of the call recipient to automatically save the user profile information, location information, or both for the calling party, and wherein the location information of the calling party comprises a latitude and longitude of the calling party.

17. The non-transitory computer-readable medium of claim 15, wherein the information sufficient to enable comprises the user profile information of the calling party, and further wherein the user profile information includes information other than the calling party's name or calling party's phone number, or includes information in addition to the calling party's name or calling party's phone number.

18. The non-transitory computer-readable medium of claim 15, wherein the information sufficient to enable comprises a location at which the user profile information of the calling party may be obtained.

19. The non-transitory computer-readable medium of claim 15, wherein the telecommunications network is an Internet Protocol Multimedia Subsystem (IMS) network and the user profile information is stored at the terminating handset of the call recipient.

20. The non-transitory computer-readable medium of claim 15, wherein the user profile information of the calling party comprises one or more of: a name, a company name, a physical address, an e-mail address, or a photograph of the calling party.

\* \* \* \* \*